United States Patent
Reid et al.

(10) Patent No.: US 12,496,162 B2
(45) Date of Patent: Dec. 16, 2025

(54) CLEANING DEVICES FOR IMAGING INSTRUMENTS, DEVICES, AND METHODS

(71) Applicant: INTUITIVE SURGICAL OPERATIONS, INC., Sunnyvale, CA (US)

(72) Inventors: Robert Reid, Fairfield, CT (US); Paul Millman, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 765 days.

(21) Appl. No.: 17/285,516

(22) PCT Filed: Oct. 18, 2019

(86) PCT No.: PCT/US2019/056983
§ 371 (c)(1),
(2) Date: Apr. 15, 2021

(87) PCT Pub. No.: WO2020/081963
PCT Pub. Date: Apr. 23, 2020

(65) Prior Publication Data
US 2021/0386507 A1    Dec. 16, 2021

Related U.S. Application Data

(60) Provisional application No. 62/747,926, filed on Oct. 19, 2018.

(51) Int. Cl.
*A61B 90/70*    (2016.01)
*A61B 1/12*    (2006.01)

(52) U.S. Cl.
CPC ............... *A61B 90/70* (2016.02); *A61B 1/12* (2013.01); *A61B 2090/701* (2016.02)

(58) Field of Classification Search
CPC ... A61B 19/34; A61B 90/70; A61B 2090/701; A61B 1/12
See application file for complete search history.

(56) References Cited

U.S. PATENT DOCUMENTS 5,313,934 A * 5/1994 Wiita ................. A61B 1/127
600/109
5,339,800 A    8/1994 Wiita et al.
(Continued)

FOREIGN PATENT DOCUMENTS

JP       2005237820 A    9/2005
WO    WO-2011060042 A1   5/2011
(Continued)

OTHER PUBLICATIONS

International Preliminary Report on Patentability for Application No. PCT/US2019/056983, mailed on Apr. 29, 2021, 11 pages.
(Continued)

*Primary Examiner* — Michael E Barr
*Assistant Examiner* — Kevin G Lee
(74) *Attorney, Agent, or Firm* — Jones Robb, PLLC

(57) ABSTRACT

A device for cleaning an instrument includes a manifold comprising one or more fluid inlets, and a tubular member rotatable relative to and extending distally from the manifold. The tubular member includes a proximal end, a distal end, and a fluid outlet at the distal end. The fluid outlet is configured to direct a flow of fluid generally across the distal end of the tubular member. The tubular member also includes one or more fluid passages fluidically coupled to the fluid outlet, and the one or more fluid passages extend from the fluid outlet to the manifold. The manifold and tubular member are configured to receive a shaft of an imaging instrument in a position such that the shaft of the imaging instrument extends through the manifold to the
(Continued)

distal end of the tubular member. Systems and methods relate to instruments and cleaning devices.

16 Claims, 15 Drawing Sheets

(56) References Cited

U.S. PATENT DOCUMENTS

| | | | |
|---|---|---|---|
| 5,400,767 A * | 3/1995 | Murdoch | A61B 1/313 600/157 |
| 5,695,448 A | 12/1997 | Kimura et al. | |
| 8,047,215 B1 * | 11/2011 | Sasaki | A61B 1/00135 134/102.1 |
| 8,118,732 B2 | 2/2012 | Banik et al. | |
| 8,852,208 B2 | 10/2014 | Gomez et al. | |
| 9,295,524 B2 | 3/2016 | Schena et al. | |
| 9,358,074 B2 | 6/2016 | Schena et al. | |
| 2006/0293559 A1 | 12/2006 | Grice, III et al. | |
| 2007/0185385 A1 | 8/2007 | Noguchi et al. | |
| 2008/0306335 A1 * | 12/2008 | Lau | A61B 1/00135 600/106 |
| 2009/0234193 A1 | 9/2009 | Weisenburgh, II et al. | |
| 2009/0247827 A1 | 10/2009 | Secrest et al. | |
| 2011/0230716 A1 * | 9/2011 | Fujimoto | G02B 27/0006 600/121 |
| 2014/0318582 A1 | 10/2014 | Mowlai-Ashtiani | |
| 2015/0087911 A1 * | 3/2015 | Konstorum | A61B 1/00091 600/157 |
| 2016/0174828 A1 | 6/2016 | Drach et al. | |
| 2017/0055811 A1 | 3/2017 | Germain et al. | |
| 2017/0238795 A1 | 8/2017 | Blumenkranz et al. | |
| 2018/0214016 A1 | 8/2018 | Thommen et al. | |

FOREIGN PATENT DOCUMENTS

| | | |
|---|---|---|
| WO | WO-2015023772 A1 | 2/2015 |
| WO | WO-2017091385 A1 | 6/2017 |

OTHER PUBLICATIONS

International Search Report and Written Opinion for Application No. PCT/US2019/056983, mailed on Feb. 7, 2020, 14 pages.
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Extended European Search Report for Application No. EP19873827.0, mailed on May 27, 2022, 8 pages.
Extended European Search Report for Application No. EP24202862.9, mailed on Dec. 17, 2024. 9 pages.

* cited by examiner

CLEANING DEVICES FOR IMAGING INSTRUMENTS, DEVICES, AND METHODS

CROSS-REFERENCE TO RELATED APPLICATIONS

This application is a U.S. national stage application under 35 U.S.C. § 371 (c) of International Application No. PCT/US2019/056983, filed Oct. 18, 2019, which claims priority to and the benefit of the filing date of U.S. Provisional Patent Application No. 62/747,926 (filed Oct. 19, 2018), entitled "CLEANING DEVICES FOR IMAGING INSTRUMENTS, DEVICES, AND METHODS," the entire contents of each of which are incorporated by reference herein.

TECHNICAL FIELD

Aspects of the present disclosure relate to cleaning devices for imaging instruments. For example, aspects of the present disclosure relate to imaging instruments including, but not limited to, endoscopes and instruments with distal end cameras or other imaging, sensing, or other tools and devices, used in remote surgical, diagnostic, therapeutic, and other treatment procedures.

INTRODUCTION

Imaging instruments, such as endoscopes, can be used to provide a view of a subject site at a location remote from the subject site. Images of a remote visual field that may not be directly viewable can be transmitted to a display device (e.g., electronic display) outside the remote visual field and so are viewable by a user. One example of such a use for an imaging instrument is during minimally invasive surgical, diagnostic, therapeutic, sensing, and/or other treatment procedures (collectively referred to as "surgical procedures" herein), which can be carried out through manual, laparoscopic tools or via teleoperated systems. During such a procedure, a lens, viewport, or other viewing portion of the imaging instrument through which the remote site is viewed can become partly or fully occluded by tissue, fluids, or other materials. As a result, a user's view of the remote site may be partly or fully obscured, and the instrument may need to be removed, cleaned, and reinserted to continue the operation. The process of removing, cleaning, and reinserting the imaging instrument can be time-consuming, which is undesirable in surgical procedures.

A need exists for devices, and for related systems and methods, that facilitate clearing a viewing portion of an imaging instrument during a procedure at a remote site without requiring removal of the imaging instrument from a location accessing the remote site. In other words, a need exists for cleaning of the viewing portion of an imaging instrument in situ while the imaging instrument is at a location for imaging the remote site.

SUMMARY

Exemplary embodiments of the present disclosure may solve one or more of the above-mentioned problems and/or may demonstrate one or more of the above-mentioned desirable features. Other features and/or advantages may become apparent from the description that follows.

In accordance with at least one embodiment of the present disclosure, a device for cleaning an instrument includes a manifold comprising one or more fluid inlets, and a tubular member rotatable relative to and extending distally from the manifold. The tubular member includes a proximal end, a distal end, and a fluid outlet at the distal end. The fluid outlet is configured to direct a flow of fluid generally across the distal end of the tubular member. The tubular member also includes one or more fluid passages fluidically coupled to the fluid outlet, and the one or more fluid passages extend from the fluid outlet to the manifold. The manifold and tubular member are configured to receive a shaft of an imaging instrument in a position such that the shaft of the imaging instrument extends through the manifold to the distal end of the tubular member. Systems and methods relate to instruments and cleaning devices.

In accordance with at least another embodiment of the disclosure, a system includes an imaging instrument and a cleaning device. The imaging instrument includes a shaft having a proximal end and a distal end, and a viewing portion at the distal end portion of the shaft. The cleaning device includes a manifold comprising one or more fluid inlets and a tubular member rotatable relative to and extending distally from the manifold. The tubular member includes a proximal end, a distal end, and a fluid outlet at the distal end. The fluid outlet is configured to direct a flow of fluid generally across the distal end of the tubular member. The tubular member includes one or more fluid passages fluidically coupled to the fluid outlet, the one or more fluid passages extending from the fluid outlet to the manifold. The manifold and tubular member are configured to receive the shaft of the imaging instrument in a position such that the shaft extends through the manifold to the distal end of the tubular member.

In accordance with yet another embodiment of the present disclosure, a system includes an imaging instrument and a cleaning device. The imaging instrument includes a shaft and a viewing portion, the shaft having a proximal end and a distal end, and the viewing portion being proximate the distal end of the shaft. The cleaning device includes a tubular member, one or more fluid inlets, and one or more fluid outlets. The tubular member has a distal end and a proximal end, and the one or more fluid inlets are fluidically coupled with one or more fluid passages extending longitudinally through the tubular member. The one or more fluid outlets are proximate the distal end of the tubular member and fluidically coupled with the one or more fluid passages. The tubular member is configured to receive the shaft of the imaging instrument. The tubular member does not protrude radially inwardly beyond an outer perimeter of the viewing portion of the imaging instrument when the shaft of the imaging instrument is received in the tubular member.

In accordance with yet another embodiment, a method of controlling cleaning of an imaging instrument includes, with the imaging instrument at a position of a remote site being imaged through a viewing portion of the imaging instrument and in response to initiation of a cleaning process, providing feedback indicative of the imaging instrument being in a cleaning state and flowing a cleaning fluid across the viewing portion of the imaging device.

In accordance with yet another embodiment, a method includes receiving a command to initiate a cleaning operation for an endoscopic imaging device, and on the condition that the command to initiate the cleaning operation is received, initiating the cleaning operation and automatically interrupting a control relationship between a user control input and a manipulator controlling a surgical instrument.

Additional objects, features, and/or advantages will be set forth in part in the description which follows, and in part will be obvious from the description, or may be learned by practice of the present disclosure and/or claims. At least some of these objects and advantages may be realized and attained by the elements and combinations particularly pointed out in the appended claims.

It is to be understood that both the foregoing general description and the following detailed description are exemplary and explanatory only and are not restrictive of the claims; rather the claims should be entitled to their full breadth of scope, including equivalents.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more embodiments of the present teachings and together with the description serve to explain certain principles and operation. In the drawings.

DETAILED DESCRIPTION

Figure 1:
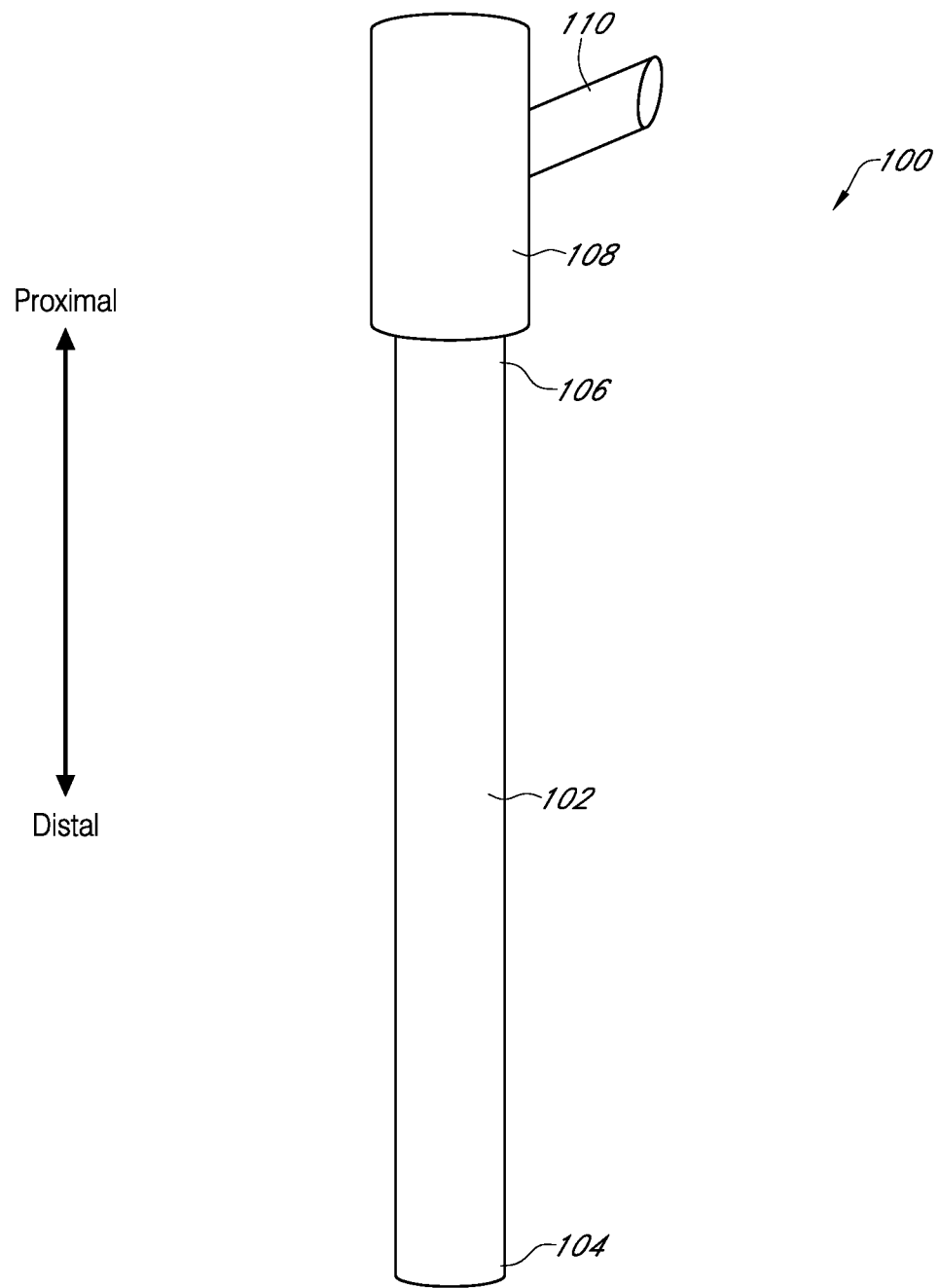
FIG. 1 is a schematic side view of an embodiment of a cleaning device for in situ cleaning of an imaging instrument according to the present disclosure.

The present disclosure contemplates various embodiments of cleaning devices that can be used for cleaning of an imaging instrument in situ, for example, while the instrument is at a location to image a remote site, such as during a remote surgical procedure or other remote procedure, for example. For example, according to various embodiments of the disclosure, a cleaning device is configured to enable in situ cleaning (such as, for example, de-fogging, de-misting, removing biological material, biological fluids, etc.) of an imaging instrument, such as an endoscope. Various embodiments of the disclosure also can facilitate an unobstructed view of the remote site and mitigate (e.g., reduce or eliminate) a need to remove the imaging instrument from the remote site for cleaning. In some embodiments, the cleaning device includes a proximal manifold portion having one or more fluid inlets for connection to one or more fluid sources. In an embodiment, the manifold includes two fluid inlets. One fluid inlet is configured to receive a supply of cleaning fluid such as, for example, a saline solution or other cleaning solution, and the other inlet is configured to receive a supply of pressurized gas, such as, for example, carbon dioxide or other gas suitable for use during surgery. In some embodiments, the cleaning fluid is used in combination with the pressurized gas to clear tissue, or other materials incident to the surgical procedure, from the distal viewing portion (e.g., lens) of the imaging instrument, and the gas is used to flush the cleaning fluid from the imaging instrument and/or dry the distal lens, thereby partly or completely clearing the distal viewing portion of the endoscope.

In various embodiments of the disclosure, the cleaning device includes a tubular member, such as a sheath, coupled to and rotatable relative to the manifold and extending to or slightly beyond the distal end of the imaging instrument viewing portion. The sheath can include one or more fluid passages fluidically coupling the manifold and one or more nozzles that direct the flow of fluid (e.g., cleaning fluid and/or gas) over the distal viewing portion of the imaging instrument. In some embodiments, the cleaning device is configured so that the sheath does not obscure a field of view of the viewing portion of the imaging instrument. In some embodiments, the imaging instrument provides an asymmetrical field of view and has an axial roll degree of freedom (i.e., rotatable along its longitudinal axis) to provide flexibility in viewing different areas or view angles of the remote site being imaged. In such embodiments, the sheath has a configuration that that avoids occlusion of the field of view as the imaging instrument, regardless of the roll orientation of the imaging instrument shaft. In some embodiments, the cleaning device comprises an optically transparent material so that if a portion of the cleaning device is positioned in the field of view, light still passes through the material of the cleaning device, thereby avoiding obscuring the field of view.

In some embodiments, the manifold is coupled to the sheath and rotatable relative to the sheath. One or more seal members can optionally be included between the manifold and the sheath to prevent liquid and/or gas from escaping between the sheath and the manifold while permitting roll rotation of the sheath, together with the imaging instrument, relative to the manifold. Maintaining the manifold in a stationary position enables connection of hoses or other conduits to the cleaning device for supply of cleaning fluids, such as, for example, saline solution and carbon dioxide gas, without twisting or tangling the hoses as the cleaning device sheath is rotated with the imaging instrument to prevent the sheath from occluding the field of view.

In some embodiments, the cleaning device includes a sheath with a distal portion defining a fluid path to direct a flow of cleaning fluid toward the imaging instrument distal viewing portion without obstructing the field of view. In one embodiment, the sheath comprises a distal opening through which a distal end of the imaging instrument is exposed. The distal opening of the sheath has a diameter equal to or larger than a diameter of the distal viewing portion of the imaging instrument. For example, the sheath can be dimensioned such that it does not protrude radially inwardly beyond an outer periphery of the viewing portion.

Embodiments of cleaning devices of the present disclosure facilitate reliable and an unobstructed view through an imaging instrument, regardless of a roll orientation of the imaging instrument, while permitting in situ cleaning of the viewing portion of the imaging instrument.

Referring now to FIG. 1, a schematic view of a cleaning device according to an embodiment of the present disclosure is shown. In the embodiment of FIG. 1, the cleaning device 100 includes a sheath portion that is a tubular member 102 having a distal end 104 and a proximal end 106. The sheath portion is dimensioned to fit around a shaft of an imaging instrument, such as imaging instrument 212 shown in FIG. 2. The proximal end 106 of the tubular member 102 is coupled to and rotatable relative to a manifold portion 108 that receives a proximal end portion of the shaft of the imaging instrument. The manifold portion 108 comprises one or more fluid inlets 110 configured to be fluidically coupled with one or more supplies of cleaning fluid (e.g., a liquid or gas) (not shown). One or more fluid outlets (not shown in FIG. 1) are fluidically coupled to the fluid inlets 110 by one or more fluid passages (also not shown). In some embodiments, the fluid passages are defined at least partially by the shaft of the imaging instrument when the shaft of the imaging instrument is received within the tubular member 102, such as between the shaft and the tubular member 102. The fluid passages can optionally be integrated with the tubular member 102, such as being formed partially or completely within the wall of the tubular member 102. The one or more fluid outlets are positioned such that when the imaging instrument shaft is within the tubular member 102, the one or more fluid outlets are positioned proximate a distal viewing portion of the imaging instrument. Fluid flowing into the one or more fluid inlets 110 is directed through the one or more fluid passages and from the one or more fluid outlets to clear material from the viewing portion of the imaging instrument.

Figure 2:
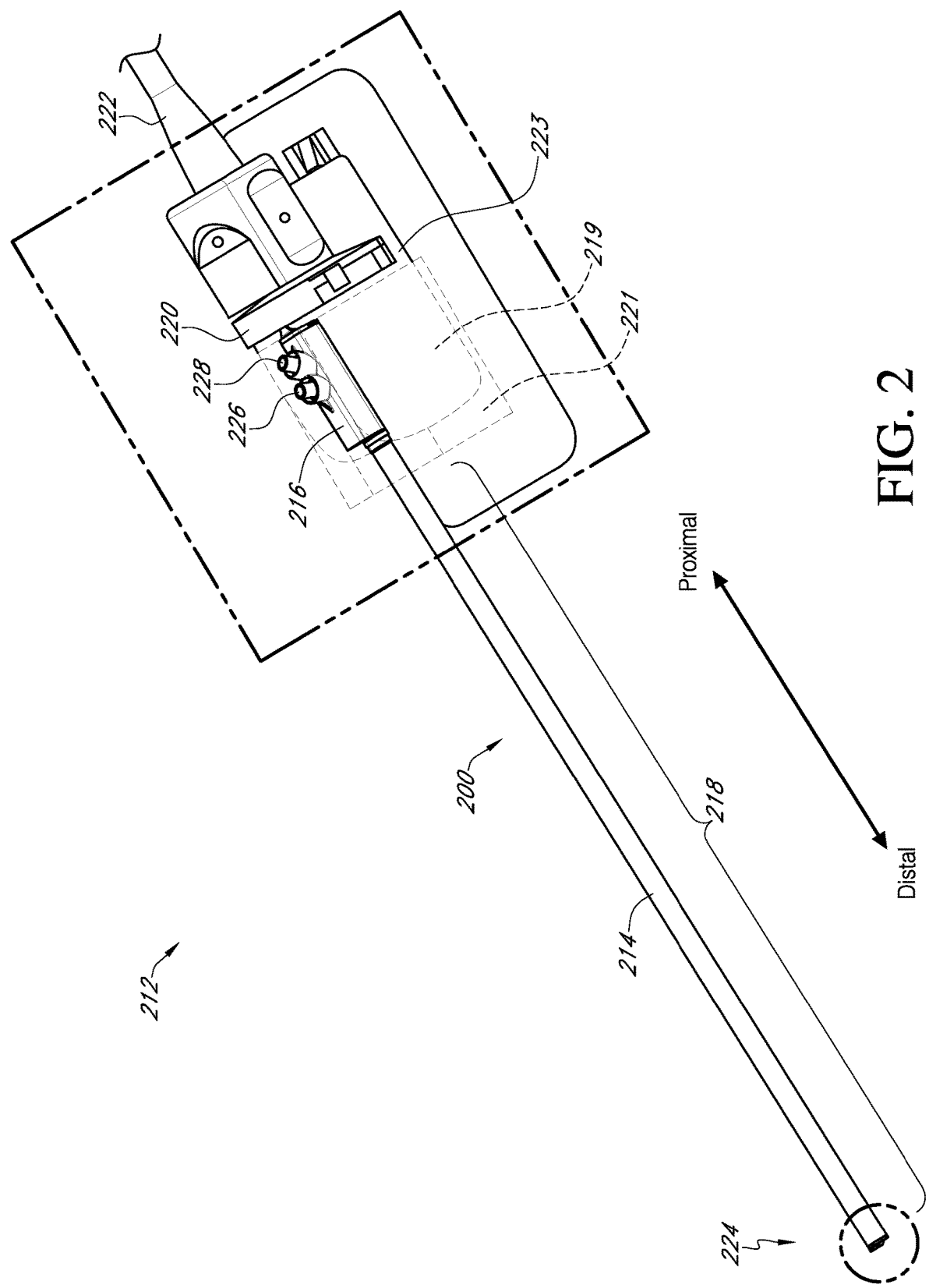
FIG. 2 is a perspective view of an embodiment of an imaging instrument and cleaning device according to the present disclosure.

Referring now to FIG. 2, an embodiment of a cleaning device 200 is shown installed on an imaging instrument 212. The cleaning device 200 includes a tubular member 214 that covers the imaging instrument shaft 218, as described with reference to FIG. 1 of the imaging instrument 212. A manifold 216 of the cleaning device is positioned around a proximal end portion of the imaging instrument shaft 218 and is optionally configured to permit mating engagement of the imaging instrument 212 with an instrument carriage 219 configured to be operably coupled to the imaging instrument 212 to impart motion such as roll and/or other degrees of freedom to the shaft 218 of the imaging instrument 212. The instrument carriage 219 can optionally be coupled to a teleoperated manipulator (such as manipulator arms 1100, 1110, 1120, 1130, 2140 in FIGS. 12 and 13 described below) that positions the imaging instrument 212 relative to a patient's body and, optionally, positions one or more other surgical instruments such as instruments 1300, 2300, 2310 in FIGS. 12 and 13. A connector portion 220 of the imaging instrument 212 is configured to couple with the instrument carriage 219 through a sterile instrument adaptor 223, and the connector portion 220 can optionally include various controls and connection components (such as a wire bundle 222) for connection to other portions of a surgical system (not shown) such as manipulator controls or other input devices, display devices, power supplies, or other components. The imaging instrument shaft 218 includes a distal end portion 224, at which a distal viewing portion such as a lens, window, or other imaging aperture is located.

The system shown in FIG. 2 further depicts a sterile adaptor surrounding the instrument carriage 219. In the system of FIG. 2, the sterile adaptor comprises a boot portion 221 coupled with an adaptor portion 223 that can optionally include intermediary drive devices, such as rotatable drive discs, to transfer drive forces from a teleoperated manipulator to the instrument carriage 219 across a sterile barrier formed by the sterile adaptor. The sterile adaptor can further include a sterile drape (not shown) attached to the boot portion 221 and used to maintain sterility of the subject site.

The cleaning device 200 extends from the connector portion 220 of the imaging instrument 212 to the distal end portion 224 of the shaft 218. The manifold 216 is positioned proximate the instrument carriage 219 when the imaging instrument 212 is coupled to the instrument carriage 219, and the tubular member 214 extends from the manifold 216 to the distal end portion 224 of the endoscope shaft 218. The manifold 216 includes one or more fluid inlet ports 226, 228 (two being shown in FIG. 2) that are each configured to accept a flow of a cleaning fluid, such as one or more of saline solution and carbon dioxide, as discussed above. The one or more inlet ports 226, 228 can optionally be configured to attach to hoses or other fluid supply tubes of a surgical system (such as manipulating system 1000 shown in FIG. 12) or supporting components of such a system. In an embodiment, the one or more inlet ports 226, 228 are configured with Luer-type fittings (not shown); however, various other types of fluid connectors, or a direct attachment, also may be utilized.

The cleaning device 200 is configured to direct fluid introduced at the one or more inlet ports 226, 228 to the distal end portion 224 of the shaft 218. In various embodiments, the manifold 216 and tubular member 214 comprise one or more fluid passages extending between the one or more inlet ports 226, 228 to a nozzle (e.g., nozzle portion 332 in FIG. 3) located at a distal end of the tubular member 214 proximate the distal end portion 224 of the endoscope shaft 218. In use, fluid travels from the one or more inlet ports 226, 228, through the one or more passages in the manifold portion 216 and the tubular member 214, and exits the nozzle. Flow of fluid from the nozzle is directed adjacent (e.g., across) the distal viewing portion of the instrument, thus washing away bodily fluids, tissue, or other debris from the distal viewing portion and removing the debris from the distal viewing portion of the imaging instrument.

Figure 3:
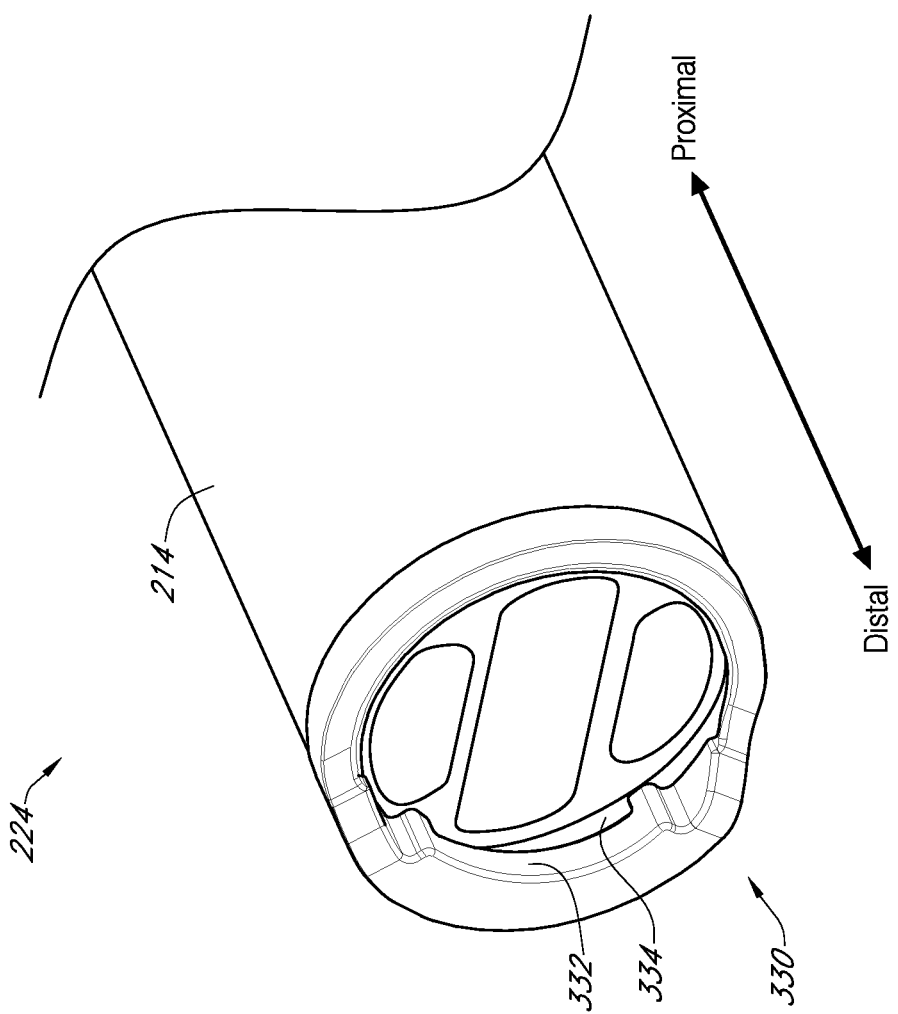
FIG. 3 is an enlarged perspective view of a distal portion shown at section 3-3 of the imaging instrument and cleaning device according to the embodiment of FIG. 2.

Referring now to FIG. 3, an enlarged perspective view of the distal end portion 224 of the imaging instrument 212 with the cleaning device 200 of FIG. 2 is shown. A perimeter of the viewing portion 330 of the imaging instrument 212 is surrounded by the tubular member 214 of the cleaning device 200. The tubular member 214 includes a nozzle portion 332 extending distally from the tubular member 214. The nozzle portion 332 includes an outlet that is configured to direct a flow of fluid (e.g., fluid flowing into the one or more inlet ports 226, 228 and along the fluid passages of the tubular member 214) across the viewing portion 330 of the imaging instrument. For example, in the embodiment of FIG. 3, the nozzle portion 332 includes a slotted outlet 334 that directs fluid flow over the viewing portion 330. As shown in FIG. 3, the nozzle portion 332 extends distally from the tubular member 214 such that it is positioned distally beyond the viewing portion 330 of the imaging instrument 212. In some embodiments, the position and shape of the nozzle portion 332 are based on the size and shape of the field of view presented by the viewing portion 330 to a display or operator, and the nozzle portion 332 is positioned and configured to prevent obscuring any portion of the field of view of the viewing portion 330.

In some embodiments in which the endoscope shaft 218 is configured to roll, the nozzle portion 332 could obscure at least a portion of the field of view if the imaging instrument has an asymmetrical field of view, and the imaging instrument is rotated relative to the nozzle portion 332 of the tubular member 214. In some embodiments, the cleaning device 200 (FIG. 2) optionally includes a rotatable coupling between the manifold portion 216 and the tubular member 214 to prevent the nozzle portion 332 from obscuring the viewing field. In this way, the tubular member of the cleaning device can rotate with the instrument shaft while the manifold remains stationary.

Figure 4:
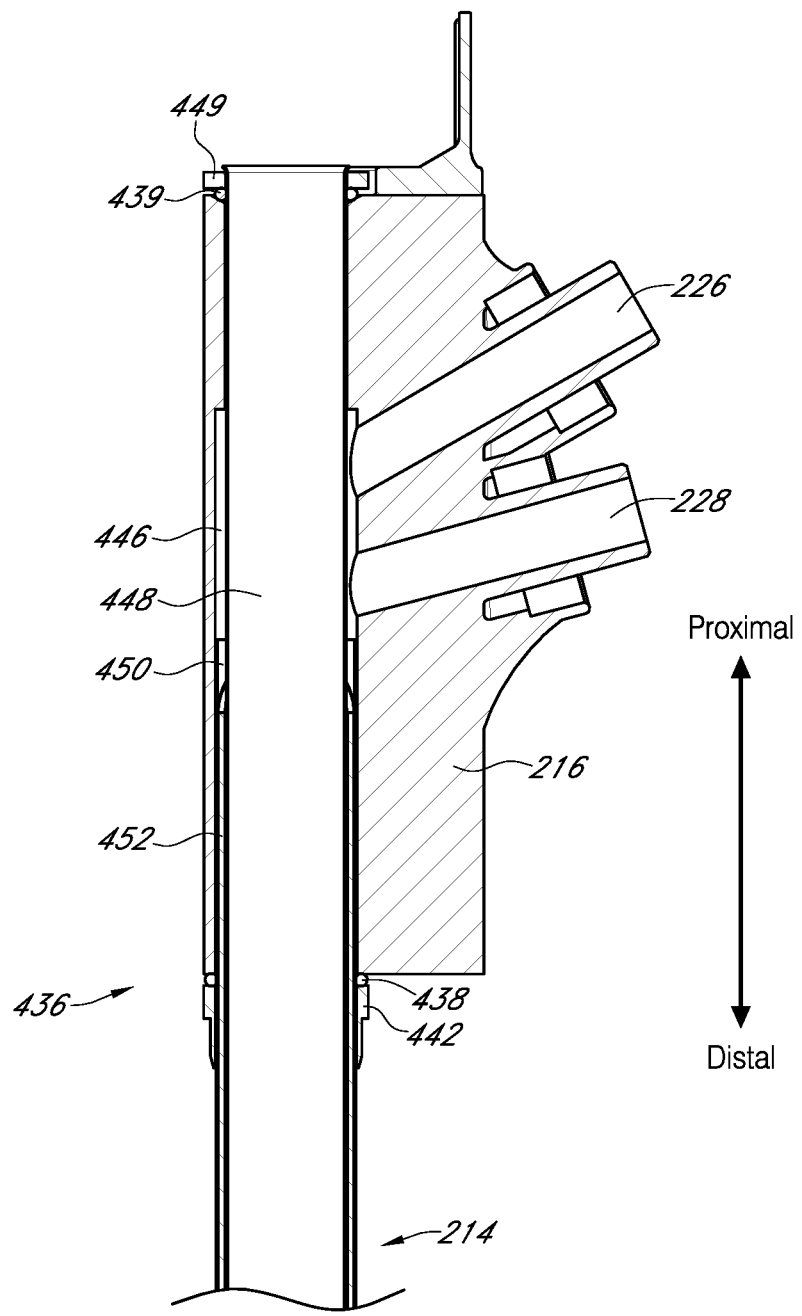
FIG. 4 is an enlarged cross-sectional view of a proximal portion shown at section 4-4 of the imaging device and cleaning device according to the embodiment of FIG. 2.

For example, referring now to FIG. 4, a cross-sectional view of the manifold 216 and a proximal portion of the tubular member 214 of the cleaning device 200 is shown. The imaging instrument shaft 218 (shown in perspective in FIGS. 2 and 3) extends through the manifold 216 and the tubular member 214. The manifold 216 is coupled with a proximal end of the tubular member 214 by a rotatable coupling 436. In the embodiment of FIG. 4, the tubular member 214 includes an inner sleeve 448, an outer sleeve 450, and a spacer member 452 between the inner sleeve 448 and the outer sleeve 450. The inner sleeve 448 extends through the manifold 216 to a proximal collar 449 at a proximal end of the manifold 216. The inner sleeve 448 is welded, swaged, or otherwise affixed to the proximal collar 449. The outer sleeve 450 of the tubular member 214 extends at least partially into an annular relief 446 in the manifold 216 to maintain concentricity between the tubular member 214 and the manifold 216. A distal collar 442 is affixed (such as by welding, an interference fit, or integrally formed with the outer sleeve 450) around the outer sleeve 450, and the manifold 216 is captive on the inner sleeve 448 between the distal collar 442 and the proximal collar 449.

The rotatable coupling 436 optionally includes one or more seal members that ensure cleaning fluids do not leak from the cleaning device between the tubular member 214 and the manifold 216. For example, in the embodiment of FIG. 4, seal members 438 and 439 between the manifold 216 and the tubular member 214 prevent leakage of cleaning fluid through the rotatable coupling 436 while permitting rotational movement between the tubular member 214 and the manifold 216.

In the embodiment of FIG. 4, the seal members 438 and 439 are O-rings. In other embodiments, the seal members 438 and 439 can be or include other annular seal members such as, for example, a gasket or other suitable sealing structures. The seal members 438 and 439 can comprise materials such as, without limitation, natural or synthetic rubber, silicone, or other polymer materials. The seal members 438 and 439 are positioned between respective sealing surfaces of the manifold portion 216 and the tubular member 214. In the embodiment of FIG. 4, the seal member 438 is located between the distal collar 442 and the manifold 216, and the seal member 439 is located between the proximal collar 449 and the manifold 216 to seal the tubular member 214 and the manifold 216 and prevent leakage of cleaning fluid from between components of the cleaning device.

In the embodiment of FIG. 4, the endoscope shaft (e.g., shaft 218 in FIG. 2) is inserted through the inner sleeve 448 to assemble the endoscope with the cleaning device. In other embodiments, the cleaning device can optionally be configured without an inner sleeve, and the shaft 218 of the endoscope device is inserted directly through the manifold 216 and spacer member 452. In such embodiments, an outer surface of the endoscope shaft 218 functions in generally the same way as an outer surface of the inner sleeve 448.

In various embodiments, the manifold 216 and tubular member 214 include features configured to facilitate flow of cleaning fluid from the manifold 216 and along the tubular member 214 to the nozzle portion 332 (FIG. 3). Such features may be configured, for example, to reduce (e.g., minimize) turbulent flow as the fluid flows from the manifold 216 to the tubular member 214. Additionally, such features may be configured to ensure that flow conditions between the manifold 216 and the tubular member 214 remain similar (e.g., the same) regardless of the rotational roll orientation of the tubular member 214 with respect to the manifold 216. For example, referring still to FIG. 4, the manifold 216 can include a portion with an interior diameter sized to create an annular relief 446 around the inner sleeve 448. The annular relief 446 is in fluid communication with the one or more inlet ports 226, 228. Fluid flowing into the inlet ports 226, 228 enters and fills the annular relief 446 surrounding the imaging instrument shaft 218.

Figure 5:
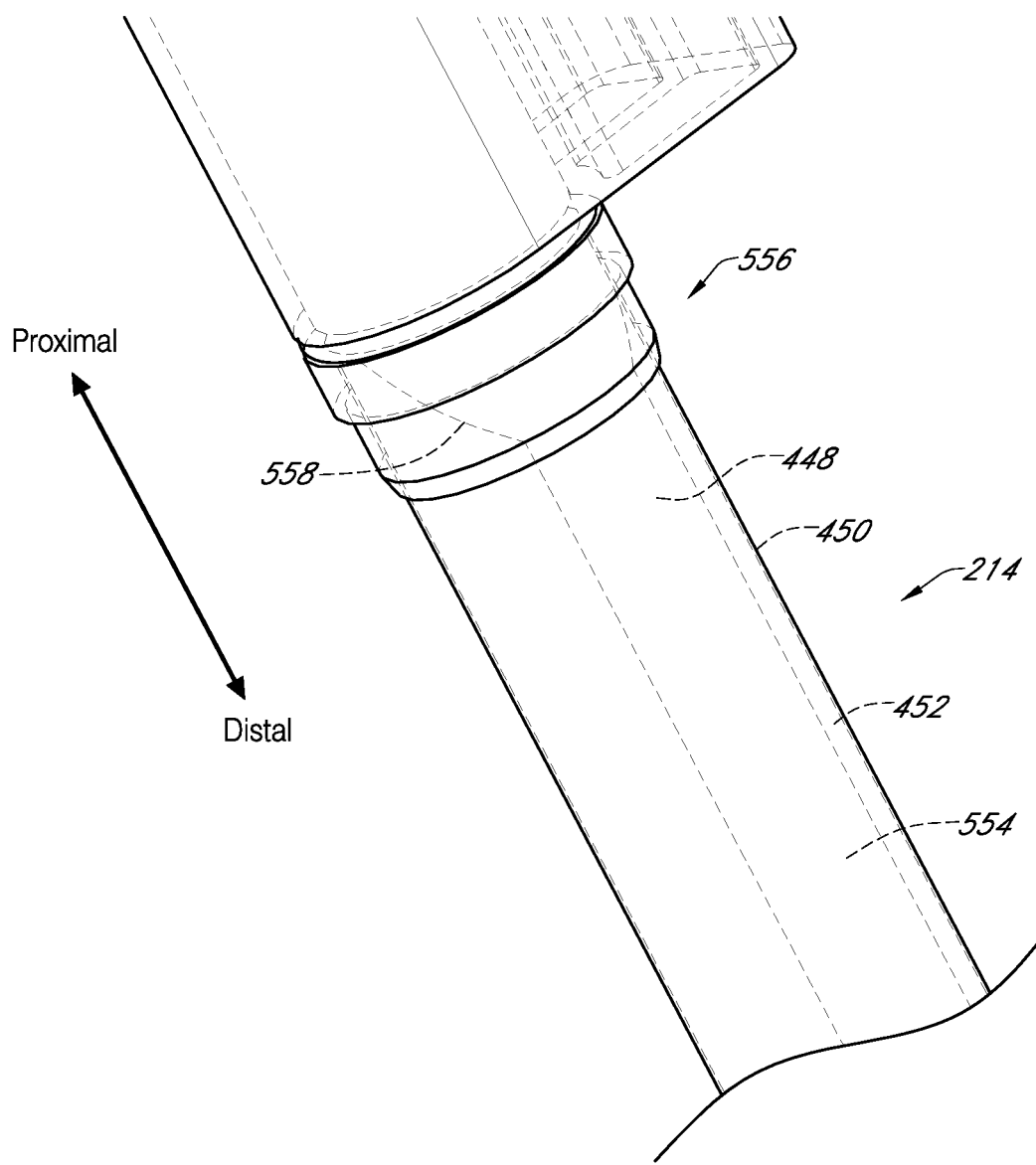
FIG. 5 is perspective, partially hidden view of the cleaning device according to the embodiment of FIG. 2.

The tubular member 214 includes various features that facilitate flow of fluid from the manifold 216 to the nozzle portion 332 (FIG. 3). Referring now to FIG. 5, a partially hidden perspective view of the imaging instrument shaft and cleaning device according to the embodiment of FIGS. 2-4 are shown to better illustrate a configuration of the tubular member 214. The tubular member 214 includes the inner sleeve 448, the outer sleeve 450, and the spacer member 452 between the inner sleeve 448 and the outer sleeve 450 as discussed in connection with FIG. 4. The spacer member 452 extends only partially around the circumference of the inner sleeve, leaving a longitudinally-oriented fluid passage 554 defined between the inner sleeve 448 and the outer sleeve 450. Stated another way, the spacer member 452 has a longitudinal opening that together with the inner sleeve 448 and outer sleeve 450 forms the fluid passage 554 along the length of the tubular member 214 between the inner sleeve 448 and outer sleeve 450. In embodiments in which the inner sleeve 448 is not included, the fluid passage 554 is at least partly defined by the shaft 218 (FIG. 2) of the imaging instrument, the spacer member 452, and the outer sleeve 450. A proximal end 556 of the spacer member 452 features a sloped profile 558 that directs fluid from the annular relief 446 (FIG. 4) to the fluid passage 554. The sloped profile 558 can assist in reducing turbulence in the fluid flow and facilitates transition of the fluid flow from the annular relief 446 into the fluid passage 554. Additionally, in some such embodiments, one or more of the inlet ports 226, 228 are positioned offset relative to a longitudinal axis of the cleaning device to induce a rotational flow through the annular relief 446. Offset inlet portions 226, 228 can optionally be included in embodiments with a straight fluid passage, such as passage 554, or with an annular passage extending to the distal end of the tubular member 214 and can reduce turbulent flow in the manifold and tubular member.

Figure 6:
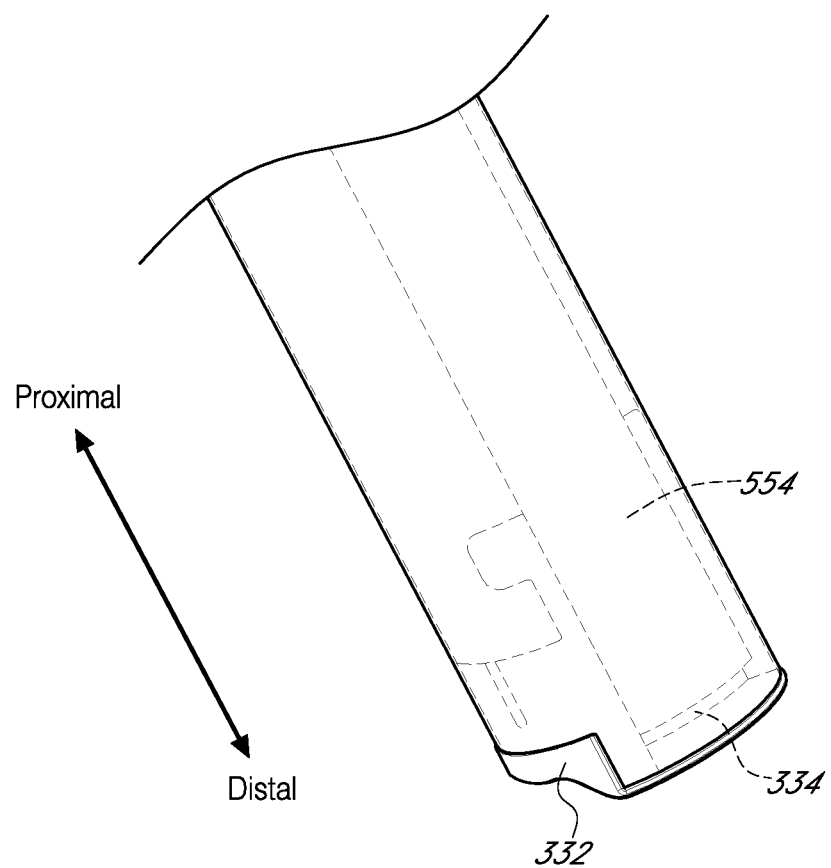
FIG. 6 is a perspective, partially hidden view of a distal end portion of the cleaning device according to the embodiment of FIG. 2.

Referring now to FIG. 6, a partially hidden view of a distal end portion of the cleaning device 200 (FIG. 2) is shown. The distal end portion includes the nozzle portion 332. As shown in FIG. 6, the fluid passage 554 defined between the inner sleeve 448 and the outer sleeve 450 terminates at the nozzle portion 332, with the outlet 334 being oriented to direct the flow from the fluid passage 554 across the face of the distal viewing portion 330 (FIG. 3) of the imaging instrument. In some embodiments, the nozzle portion 332 can optionally include contours that smooth the flow of fluid and facilitate changing the direction of the cleaning fluid flow from the flow along the fluid passage 554 to the flow across the face of the endoscope viewing portion. In various other embodiments, the nozzle portion 332 can optionally include a sloped profile similar to the sloped profile 558 of the spacer member 452, and the fluid passage can optionally have an annular shape along the length of the cleaning device.

In use, when the imaging instrument shaft 218 (FIG. 2) is rolled, e.g., by activation of the instrument carriage 219 (FIG. 2), the tubular member 214 rotates with the shaft 218 while the manifold 216 remains stationary with respect to the instrument carriage 219. Relative rotation between the manifold and the tubular member permitted by the rotatable coupling 436 thus allows the tubular member to maintain a fixed rotational orientation relationship with the instrument as the shaft is rotated, thereby preventing occlusion of the field of view of the imaging instrument by the nozzle portion.

Various embodiments further provide for an equalization of an electrical potential that may exist at the imaging instrument shaft and an electrical potential of the body of the patient (e.g., a body electrical ground potential). In some embodiments, the tubular member 214 of the cleaning device can provide an electrically conductive path between the imaging instrument shaft 218 and an external surface of the tubular member 214. In some embodiments, the inner sleeve 448 and outer sleeve 450 comprise an electrically conductive material, such as, for example, stainless steel. The nozzle portion 332 also can comprise an electrically conductive material arranged to be in electrically conductive contact with both the inner sleeve 448 and the outer sleeve 450. The conductive material thereby forms an electrically conductive path from the instrument shaft 218, which is in contact with the inner sleeve 448, to the patient's body, which is in contact with the outer sleeve 450 through, e.g., a conductive cannula inserted through an incision in the patient's body. In other embodiments, the nozzle portion 332 comprises an optically transparent polymer, and other components of the cleaning device create an electrically conductive path between the imaging instrument shaft and the external surface of the tubular member 214.

Figure 15:
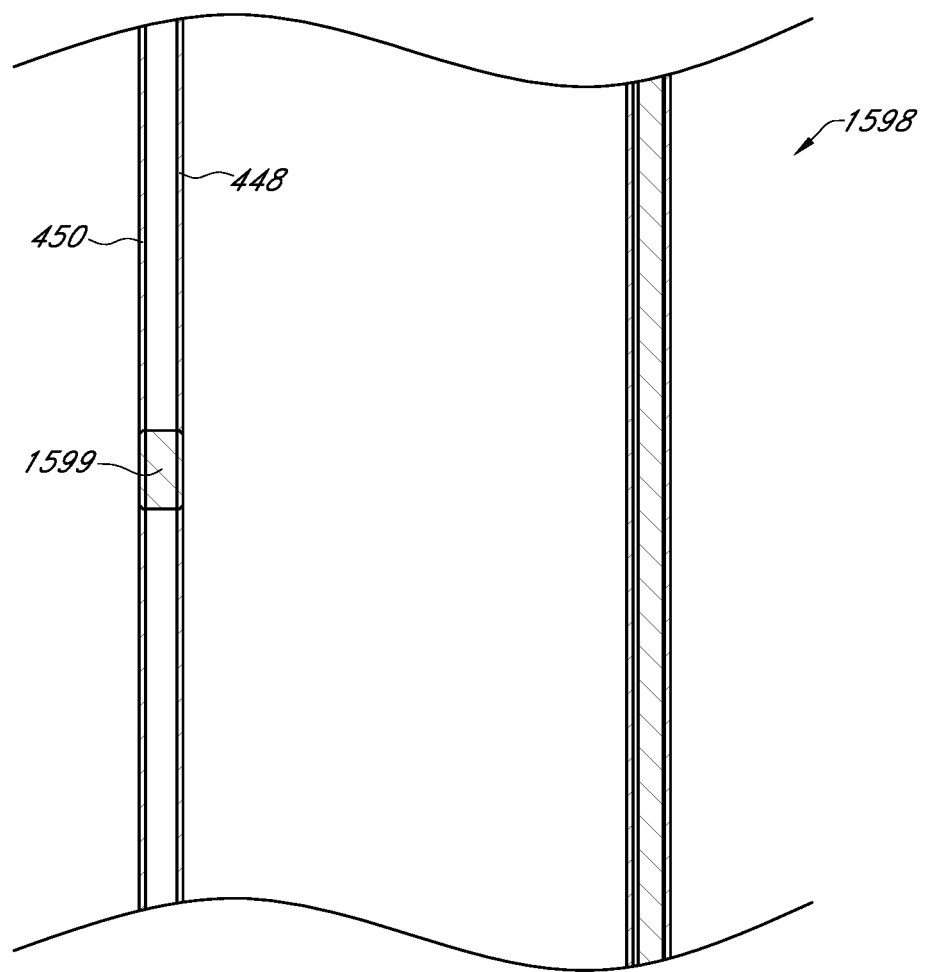
FIG. 15 is a cross-sectional view of a tubular member of a cleaning device according to yet another embodiment of the present disclosure.

For example, a conductive element can be provided to conductively couple the inner sleeve 448 to the outer sleeve 450. Referring now to FIG. 15, a cross-sectional view of a tubular member 1598 of a cleaning device according to another embodiment of the disclosure is shown. A conductive pin 1599 is in conductive contact with inner sleeve 448 and outer sleeve 450. The conductive pin 1599 can be provided at any location between the inner sleeve 448 and outer sleeve 450 to provide conductive contact between the inner sleeve 448 and outer sleeve 450. In other embodiments, the conductive pin 1599 could be replaced by a conductive ring extending circumferentially around the tubular member 214, or, alternatively, multiple conductive pins 1599. The conductive pin 1599 or other conductive components can comprise materials such as metals or metal alloys, such as stainless steel, titanium or aluminum alloys, conductive composite materials such as carbon-impregnated polymers, or other electrically conductive materials.

Other components of a cleaning device can comprise materials chosen for ease of manufacturing and assembly. With reference to the embodiment of FIGS. 2-6, the spacer member 452 and the manifold 216 are made from a polymer such as, for example and not limitation, high density polyethylene (HDPE) or polycarbonate. In other embodiments, such components can comprise composite materials, plastics, metals or metal alloys, or other materials.

Figure 7:
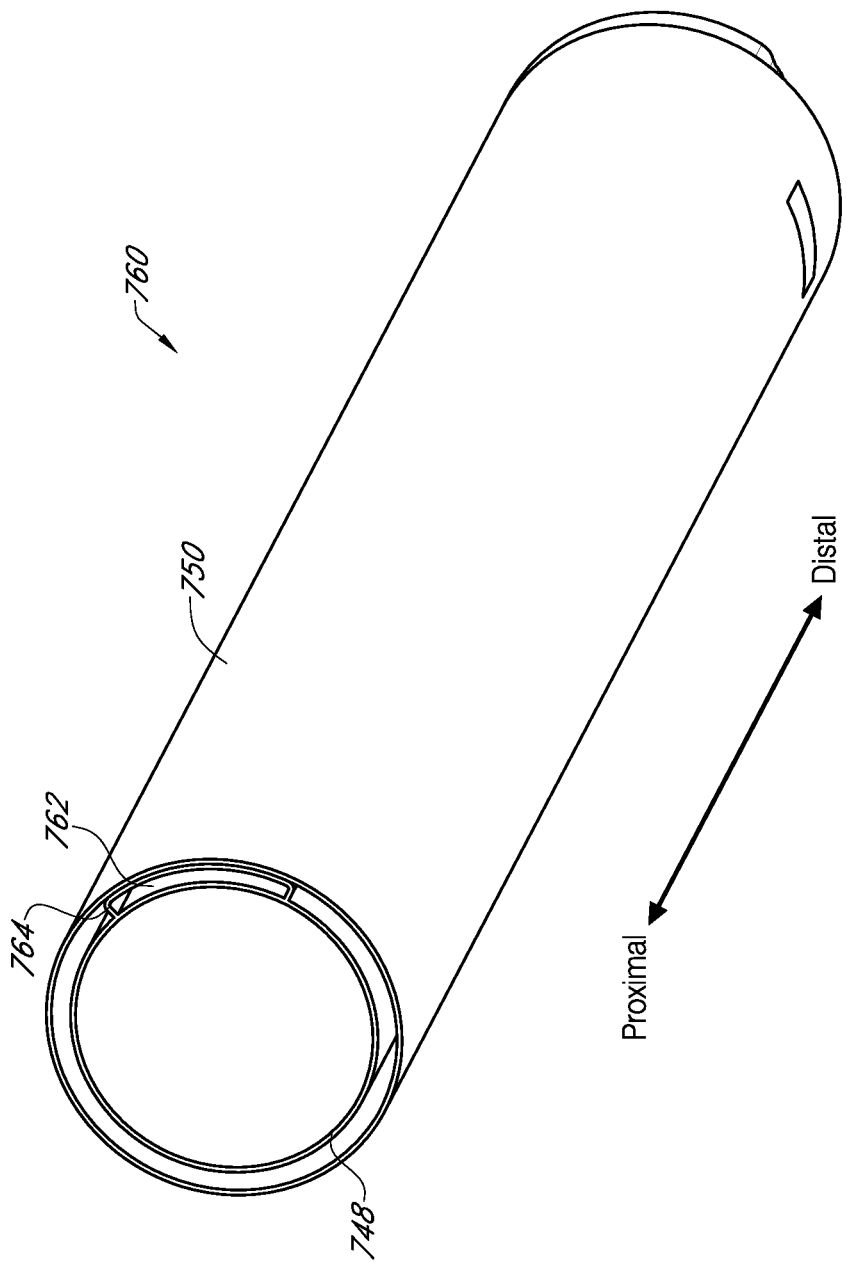
FIG. 7 is a perspective view of a tubular member of a cleaning device according to another embodiment of the disclosure.
Figure 8:
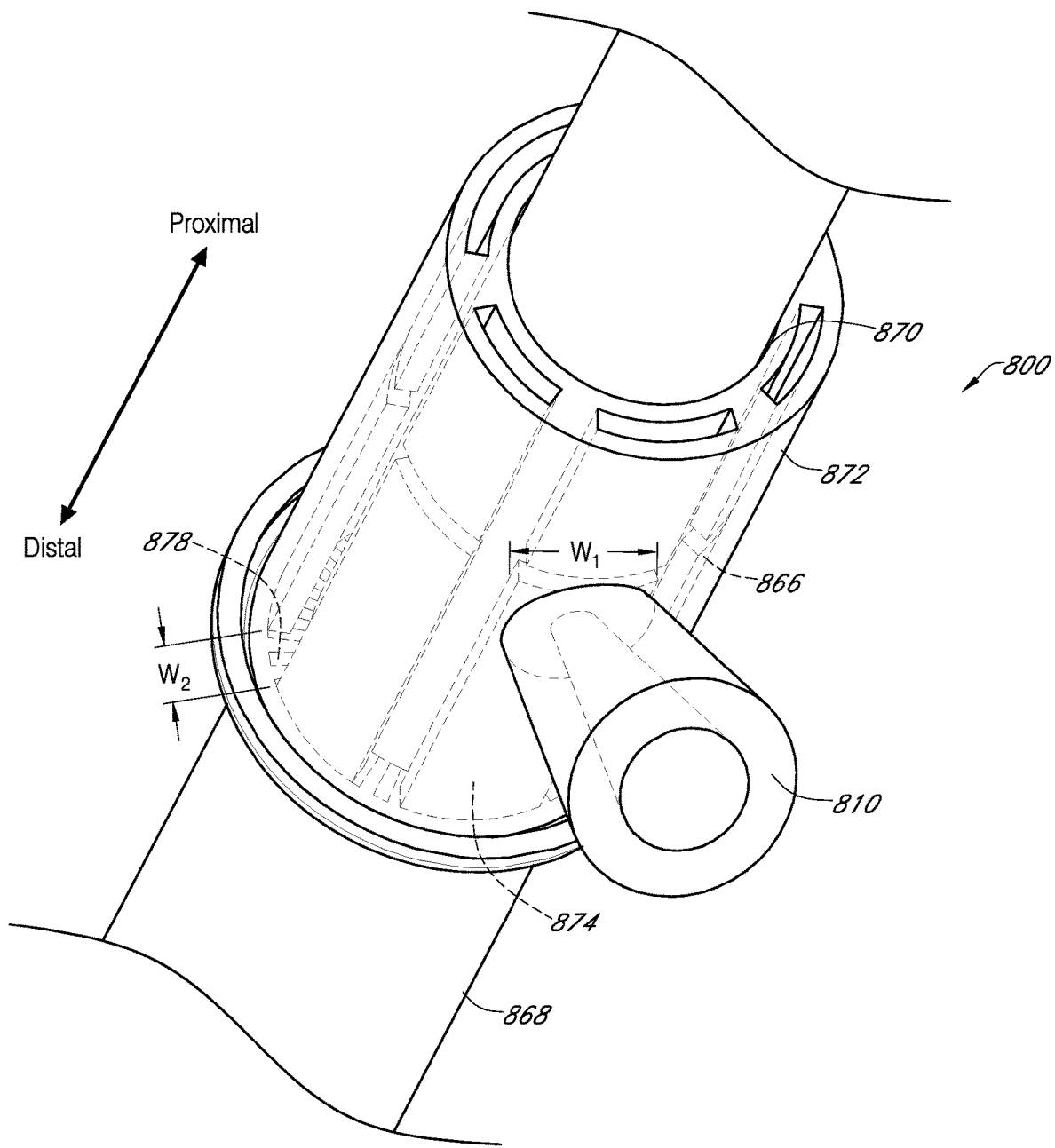
FIG. 8 is a perspective, partially hidden view of a proximal portion of a cleaning device according to another embodiment of the present disclosure.

Referring now to FIG. 7, a cleaning device tubular member 760 according to another embodiment of the disclosure is shown in perspective view. In the embodiment of FIG. 7, a fluid passage 762 is enclosed by a conduit 764 located between an inner sleeve 748 and an outer sleeve 750. As a non-limiting example, in the embodiment of FIG. 7, the conduit 764 comprises a metal or a metal alloy, such as a stainless steel (e.g., iron alloy including nickel and/or chromium alloying elements), titanium alloy, or other metal. The inner sleeve 748 and outer sleeve 750 can comprise the same material as the conduit 764 or material different from the conduit 764. In some embodiments, the inner sleeve 748, outer sleeve 750, and conduit 764 are welded to one another. The embodiment of FIG. 7 can optionally include a spacer device similar to spacer member 452 to direct fluid from the annular relief 446, discussed above with reference to FIG. 4, into the conduit 764. In the embodiment of FIG. 8, however, such a spacer would not be required to extend to the distal end of the tubular member 760, because the fluid passage 762 is defined by the conduit 764. In other words, in such an embodiment, the spacer only functions to direct fluid into the conduit 764 and does not extend along the length of the tubular member 760.

Figure 9:
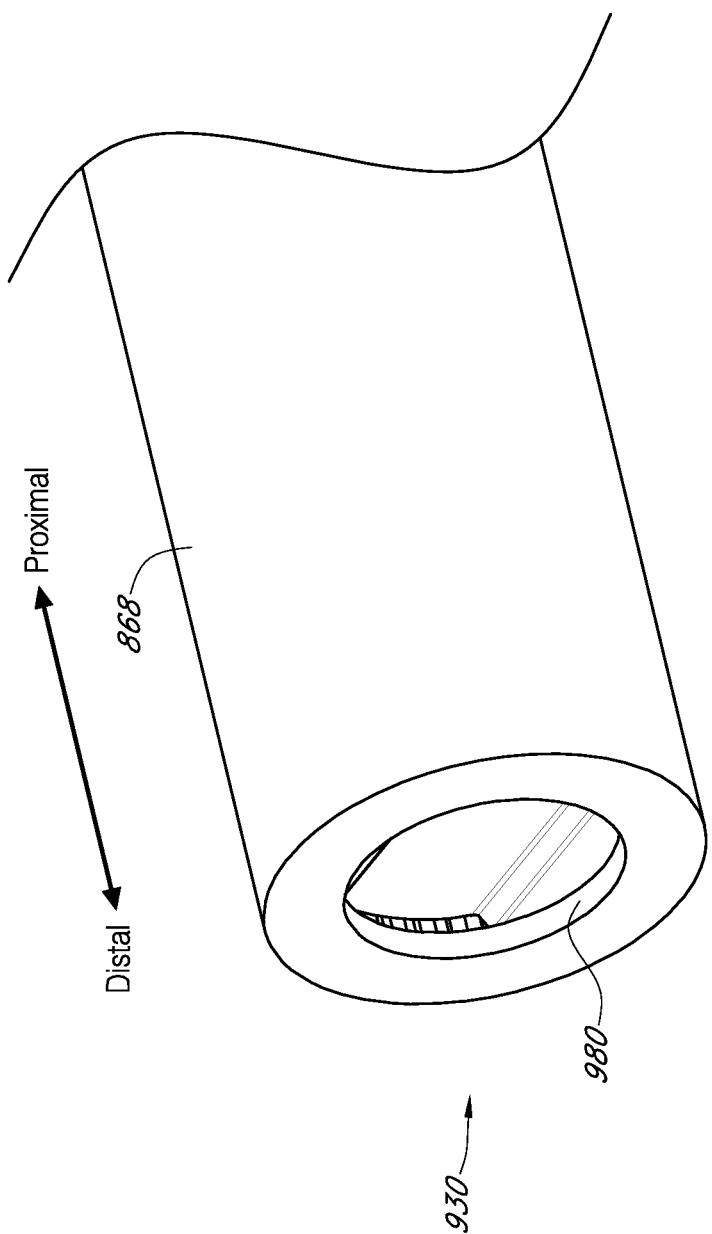
FIG. 9 is a perspective view of a distal portion of the cleaning device according to the embodiment of FIG. 8.
Figure 10:
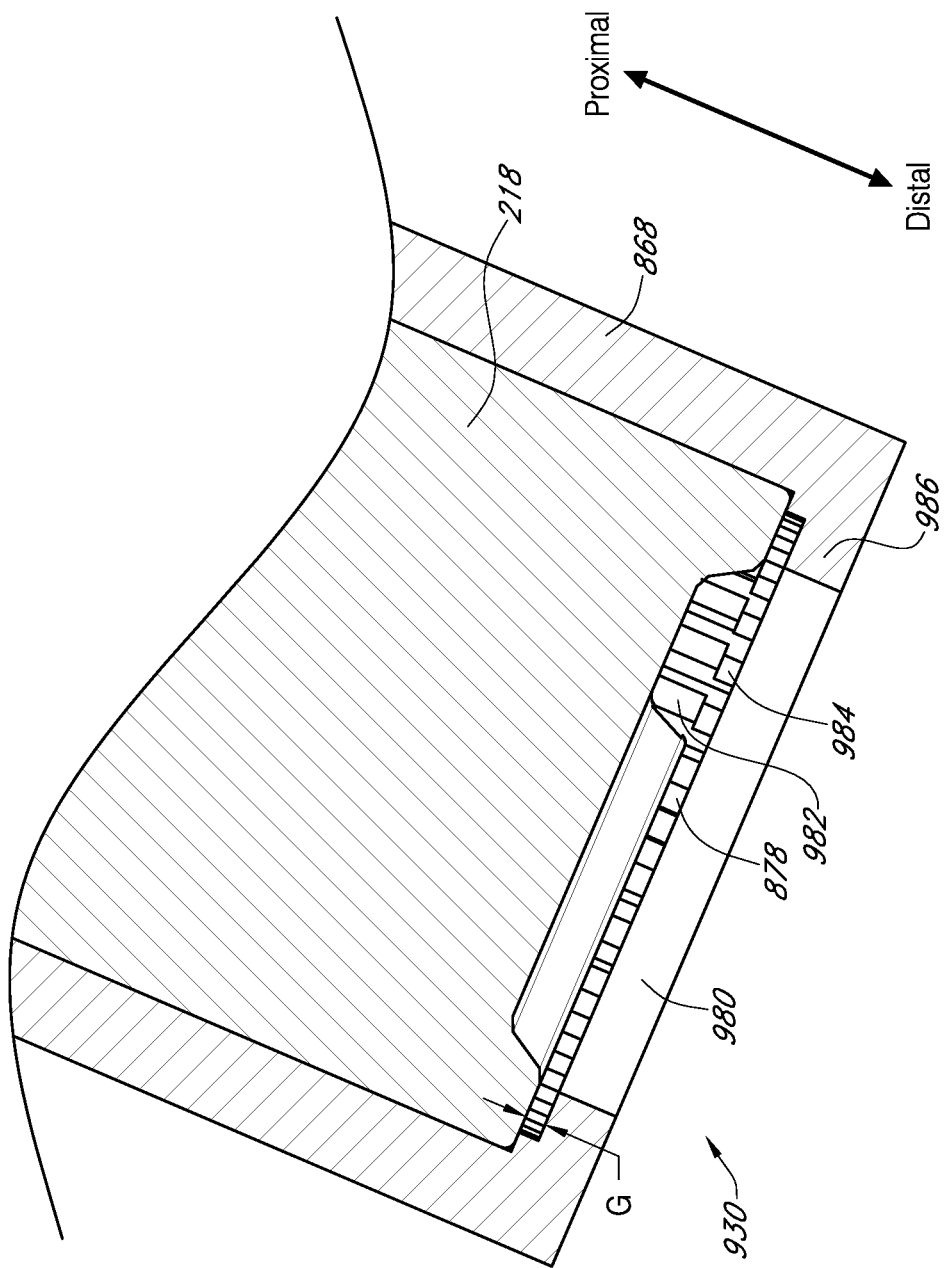
FIG. 10 is a cross-sectional, detailed view of the distal portion of the cleaning device according to the embodiment of FIG. 8.

FIGS. 8-10 show another cleaning device according to an embodiment of the disclosure. Referring to FIG. 8, a portion of a cleaning device 800 is shown with partially hidden lines to illustrate the interior portions of the cleaning device 800. The cleaning device 800 includes a manifold 866 and a tubular member 868, generally as described above with reference to the other embodiments. The manifold 866 and tubular member 868 are rotationally decoupled from one another, and the cleaning device 800 can optionally include a seal member (not shown), for example, similar to the seal member 438 shown in the embodiment of FIG. 4. The manifold portion 866 comprises a central bore 870 configured to receive an imaging instrument shaft, such as shaft 218 (FIG. 2). Surrounding the central bore 870 and extending longitudinally through a lateral wall 872 of the manifold 866 is a fluid passage 874 (also referred to as manifold fluid passage 874) having a circumferential width $W_1$. The fluid passage 874 is in fluid communication with a fluid inlet 810. The tubular member 868 includes a plurality of fluid passages 878 (also referred to as tubular member fluid passages 874) that each extend longitudinally through the tubular member 868 and have a width $W_2$ along the tubular member's circumference. The fluid passages 878 are in fluid communication with the fluid passage 874 at a junction between the manifold 866 and the tubular member 868.

The width $W_1$ of the fluid passage 874 in the manifold 866 and the width $W_2$ of the fluid passages 878 in the tubular member 868 are chosen to facilitate fluid flow between the manifold fluid passage 874 and the tubular member fluid passages 878. For example, the width and number of the respective fluid passages can be chosen and arranged so that the flow characteristics of the fluid flow from the manifold 866 to the tubular member 868 are similar for all rotational orientations of the tubular member 868 with respect to the manifold 866. In the embodiment of FIG. 8, the width $W_1$ of the manifold fluid passage 874 is larger than the width $W_2$ of the tubular member passages 878. With the arrangement of the embodiment of FIG. 8, regardless of the rotational orientation of the tubular member 868 relative to the manifold 866, the manifold fluid passage 874 is always in fluid communication with one or more of the tubular member fluid passages 878. In some embodiments, the manifold fluid passage 874 is always in fluid communication with at least two of the tubular member fluid passages 878, at least three of the tubular member fluid passages 878, or more than three of the tubular member fluid passages 878. For example, as shown in the embodiment of FIG. 8, the manifold fluid passage 874 is in communication with at least four of the tubular member fluid passages 878 regardless of the rotational orientation between the manifold 866 and the tubular member 868.

Other arrangements and numbers of fluid passages in the manifold 866 and tubular member 868, such as the tubular member fluid passages 878 having a width $W_2$ greater than a width $W_1$ of the manifold fluid passage 874, multiple manifold fluid passages 874, or other variations of the arrangement shown in FIG. 8, are within the scope of the disclosure.

Referring now to FIGS. 9 and 10, a distal end portion of the imaging instrument cleaning device 800 shown in FIG. 8 is shown. A distal viewing portion 930 of the imaging instrument is exposed through an aperture 980 in the tubular member 868. Referring to FIG. 10, a cross-sectional view of the distal end portion of the cleaning device 800 of FIGS. 8 and 9 is shown. Ridges 982 defined between the tubular member fluid passages 878 include portions 984 that extend radially inwardly and space the instrument shaft 218 from an annular lip 986 of the tubular member 868, leaving a gap G between the distal viewing portion 930 and the annular lip 986 of the tubular member 868. Fluid flowing down the tubular member fluid passages 878 exits the passages 878 and is redirected across the distal viewing portion 930 by the annular lip 986. In the embodiment of FIGS. 8-10, the fluid flows radially inwardly across the imaging instrument's distal viewing portion 930 from locations around substantially the entire inside perimeter of the tubular member 868, and the particular fluid passages 878 from which the fluid flows are determined by the rotational orientation between the tubular member 868 and the manifold 866. In the embodiment of FIGS. 8-10, the tubular member 868 does not protrude radially inwardly beyond a perimeter of the viewing portion 930, thereby preventing obstruction of the viewing portion 930 and the field of view thereof. In other embodiments, the tubular member 868 can optionally comprise a clear material, such as a transparent polymer, to mitigate obstruction of the viewing portion 930, even if the tubular member 868 extends at least partly over the viewing portion 930.

In the embodiments described above in connection with FIGS. 2-10, the tubular member and manifold of the cleaning devices are configured to rotate with respect to one another based on rotation of the endoscope shaft, e.g., driven by teleoperated manipulator (such as a teleoperated manipulator operatively coupled to instrument carriage 219 shown in FIG. 3). Such an arrangement can enable rotation of the imaging device to provide different views of a remote site without the field of view being obscured by the cleaning device.

In other embodiments, imaging instrument cleaning devices are configured to avoid obscuring the field of view by configuring the distal end portion of the cleaning device such that no portion of the cleaning device enters the field of view of the imaging instrument, regardless of the roll orientation of the imaging instrument relative to the cleaning device. In such embodiments, the cleaning device can optionally comprise a sheath portion and a manifold portion that are fixedly coupled to one another, such as being integrally formed as a single monolithic piece or formed from two or more components affixed or otherwise joined to one another. Such embodiments can be used, for example, in arrangements in which the direction and orientation of fluid flow across the endoscope tip does not have to be at a fixed rotational orientation with reference to the endoscope.

Figure 11:
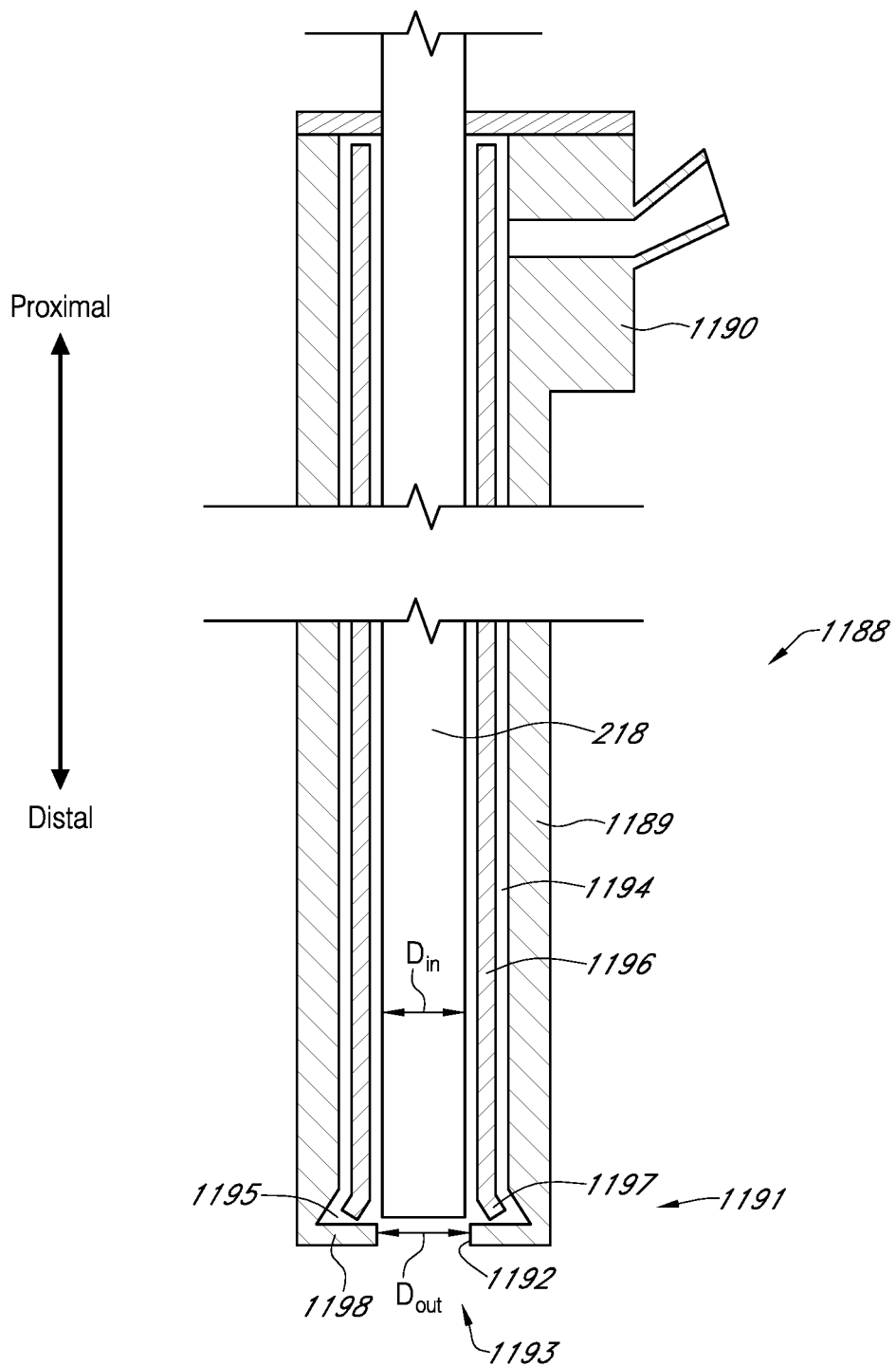
FIG. 11 is a cross-sectional, side view of a cleaning device according to another embodiment of the disclosure.

For example, referring now to FIG. 11, another embodiment of a cleaning device for an imaging instrument is shown. In the embodiment of FIG. 11, the cleaning device 1188 includes a tubular member 1189 and a manifold 1190 that are coupled in a non-rotatable manner, such as being integrally formed, or formed from multiple components and secured together, such as by adhesive, welding, or other securing mechanism. A distal end 1191 of the tubular member 1189 includes an aperture 1192 with an inner diameter $D_{in}$.

An imaging instrument shaft 218 extends through the tubular member 1189, and a distal viewing portion 1193 of the imaging instrument is exposed through the aperture 1192. The shaft 218 has an outer diameter $D_{out}$. The inner diameter $D_{in}$ of the aperture 1192 is equal to the outer diameter $D_{out}$ of the shaft 218. In some embodiments, the inner diameter $D_{in}$ of the aperture 1192 is greater than the outer diameter $D_{out}$ of the shaft 218. As discussed above with reference to the embodiment of FIGS. 8-10, the tubular member 1189 also does not protrude radially inwardly beyond the perimeter of the viewing portion 1193 of the imaging instrument, thereby preventing obstruction of the field of view of the viewing portion 1193.

As shown in FIG. 11, the tubular member 1189 includes a fluid passage 1194 through which fluid flows from the manifold portion 1190 to a nozzle 1195. An annular lip 1198 defined by the aperture 1192 and extending radially inward at the distal end of the tubular member 1189 redirects the fluid flow radially inwardly across the distal viewing portion 1193 to wash debris or other matter from the distal viewing portion 1193.

In the embodiment of FIG. 11, an inner sleeve 1196 of the tubular member 1189 includes a flared portion 1197 that flares radially outward near the distal end of the tubular member 1189. The flared portion 1197 flares away from the imaging instrument shaft 218 near the distal end of the shaft 218 to facilitate locating the nozzle 1195 radially outward from the outside diameter of the shaft 218. The nozzle 1195 can optionally extend around the entire perimeter of the shaft 218 as an annulus, or alternatively, can comprise any number of discrete fluid flow paths located at any desired locations so as to be positioned around the perimeter of the shaft 218 as needed to facilitate flow of the fluid for cleaning the viewing portion 1193. In other embodiments, the tubular member 1189 does not include the flared portion 1197, and the fluid passage 1194 is positioned further radially outward, or with a gradual taper outward along the length of the tubular member 1189, to facilitate the inner diameter $D_{in}$ of the aperture 1192 being greater than the outer diameter $D_{out}$ of the shaft 218.

In some embodiments, the imaging instrument may be operably coupled to a display device configured to receive data from the imaging instrument. For example, the display device may be part of a surgical system and display an image of the remote site, e.g., in a patient's body or target of interest, captured by the imaging instrument. The imaging instrument may also be operably coupled to a fluid control system to control flow of fluid introduced to the cleaning device, such as flow of one or both of saline solution and carbon dioxide or other fluids. A control system may further be configured (e.g., programmed) to control the display based on a status of the cleaning device. For example, because the fluids used to clear the viewing portion potentially disrupt or obscure view of the remote site of interest, the control system can optionally be configured to indicate to the viewer that the imaging instrument is undergoing a cleaning process. Such indication may be visual, auditory, haptic, and/or other suitable feedback. Additionally or alternatively, the control system can optionally be configured to modify the image displayed based on the cleaning device being in use. For example, in one embodiment the display changes from color to greyscale or other monochrome or alternative color scale to indicate that the imaging instrument is undergoing a cleaning process. In another embodiment, the display presents a blank screen or displays a message indicating the cleaning procedure is occurring.

In some embodiments, the control system is optionally configured to move the imaging instrument in a specified manner during cleaning to facilitate the cleaning process. For example, the control system may be configured to automatically roll the imaging instrument during a cleaning process. Such a process can optionally include rolling the imaging instrument a predetermined amount from an initial position while supplying a flow of cleaning fluid to the imaging instrument, and then rotating the imaging instrument back to the initial position while the cleaning fluid is flowing or after ceasing flow of the cleaning fluid. In some situations, rotation of the imaging instrument enables the cleaning fluid to clean the viewing portion more thoroughly by ensuring all portions of the viewing portion are exposed to the flow of cleaning fluid.

Additionally or alternatively, the control system can be configured to control a sequence of flow of the cleaning fluids input into the one or more fluid inlets (e.g., inlet ports 226, 228 in FIG. 2). In some embodiments, the control system is configured to flow saline solution (or another liquid) over the distal viewing portion to wash away tissue, body fluids, or other matter from the distal viewing portion. After the matter is removed by the liquid, the control system then flows a gas, such as nitrogen or carbon dioxide, across the distal viewing portion to clear the liquid to restore a clear view from the viewing portion.

The control system can optionally be further configured to prevent operator manipulation of the instrument and other surgical instruments during the cleaning process. In some embodiments, the control system is programmed to interrupt the ability of one or more user-controlled input devices from controlling corresponding teleoperated manipulators and associated surgical instruments, such as surgical instruments 1300, 2300, 2310 in FIG. 12. Since the cleaning process potentially interferes with operator view of the remote site of interest through the imaging instrument, this control interruption prevents the operator from operating the surgical instruments with an obstructed view of the remote site. In some embodiments, the control system automatically reestablishes the control relationship when the cleaning is complete. In other embodiments, the control system automatically reestablishes the control relationship on one or more conditions, such as a control input device has not moved beyond a predefined translation or orientation while the control relationship is interrupted. In still other embodiments the control system does not automatically reestablish a control relationship between an input device and its associated teleoperated manipulator until the input device operator commands the control system to do so.

Figure 13:
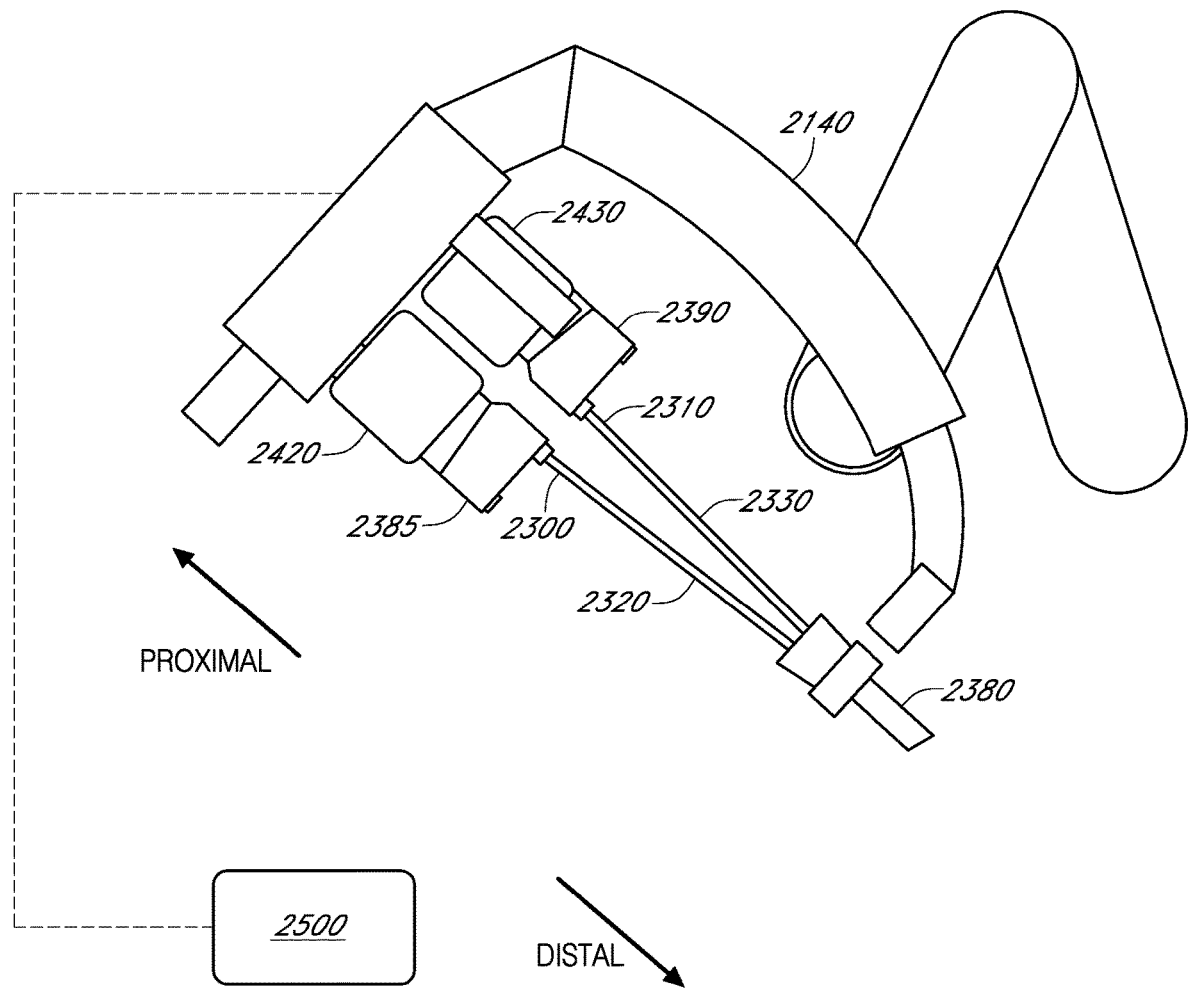
FIG. 13 is a partial schematic view of an embodiment of a manipulating system according to another embodiment of the present disclosure.
Figure 14:
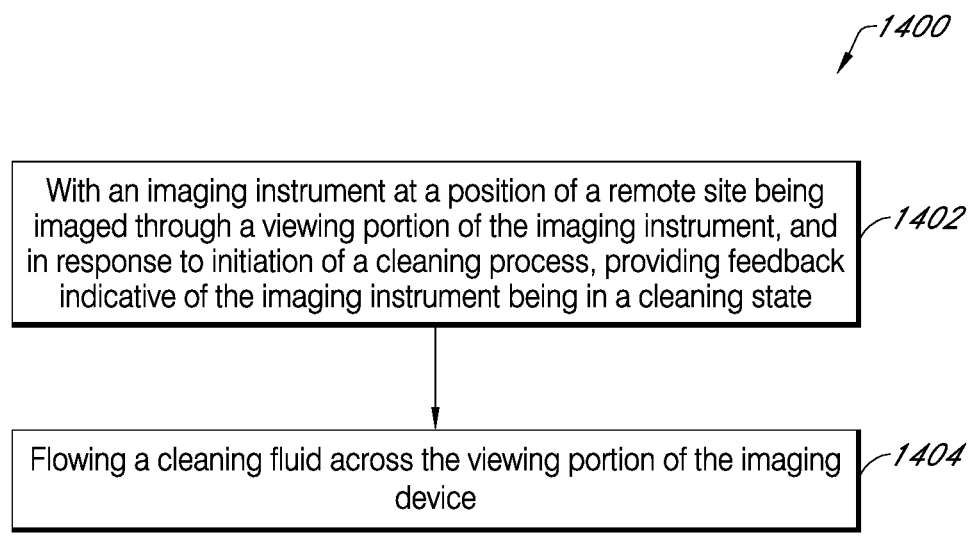
FIG. 14 is a workflow according to another embodiment of the present disclosure.

Referring now to FIG. 14, an embodiment of a workflow 1400 for in situ cleaning of an imaging instrument is shown. At 1402, with an imaging instrument at a position of a remote site being imaged through a viewing portion of the imaging instrument, and in response to initiation of a cleaning process, the workflow 1400 includes providing feedback indicative of the imaging instrument being in a cleaning state. The feedback can include, for example, changing an image displayed by a display device operably coupled to the imaging device from an initial state, e.g., to an indicating state in which the cleaning state is indicated. The initial state can include, for example, a full-color display of an image captured by the imaging device. The indicating state can include an indication that a cleaning process is being carried out. Such an indication can include, for example, one or both of changing the color scale of the display to, for example, grey scale, displaying an indicator, notice, or message on the display, blanking part or all of the display, or other indications. At 1404, a cleaning fluid is flowed across the viewing portion of the imaging device. The workflow 1400 can further include returning the display device from the indicating state to the initial state. The display device can include, for example, display devices 1500, 2500 discussed below in connection with FIGS. 12 and 13. Those having ordinary skill in the art would understand that the indication need not be a visual indication at the display, but can include or alternatively be auditory, haptic, and/or other types of feedback.

Embodiments of the disclosure provide cleaning devices that enable in situ cleaning of an imaging device viewing portion while the imaging instrument viewing portion is located to capture images of a remote site of interest without the need to remove the imaging device to access the viewing portion. Such devices are configured to prevent obscuring a field of view of the imaging instrument, thereby providing consistent and reliable visualization of a remote site of interest.

Embodiments incorporating inventive aspects described herein may be used, for example, with remotely operated, computer-assisted systems (such, for example, teleoperated surgical systems) such as those described in, for example, U.S. Pat. No. 9,358,074 (filed May 31, 2013) to Schena et al., entitled "Multi-Port Surgical Robotic System Architecture", U.S. Pat. No. 9,295,524 (filed May 31, 2013) to Schena et al., entitled "Redundant Axis and Degree of Freedom for Hardware-Constrained Remote Center Robotic Manipulator", and U.S. Pat. No. 8,852,208 (filed Aug. 12, 2010) to Gomez et al., entitled "Surgical System Instrument Mounting", each of which is hereby incorporated by reference in its entirety. Further, embodiments incorporating one or more aspects described herein may be used, for example, with a da Vinci® Surgical System, such as the da Vinci Si® Surgical System (model number IS3000) or the da Vinci Xi® Surgical System, both with or without Single-Site® single orifice surgery technology, all commercialized by Intuitive Surgical, Inc., of Sunnyvale, California. Although various embodiments described herein are discussed with regard to imaging instruments used with a manipulating system of a teleoperated surgical system, the present disclosure is not limited to use with imaging instruments for a teleoperated surgical system. Various embodiments described herein can optionally be used in conjunction with hand-held, manual imaging instruments, or other imaging instruments that are configured to provide images of remote sites to assist in performing procedures remotely at such remote sites. For example, various space exploration and other remote inspection and/or sensing applications are considered within the scope of the present disclosure.

Figure 12:
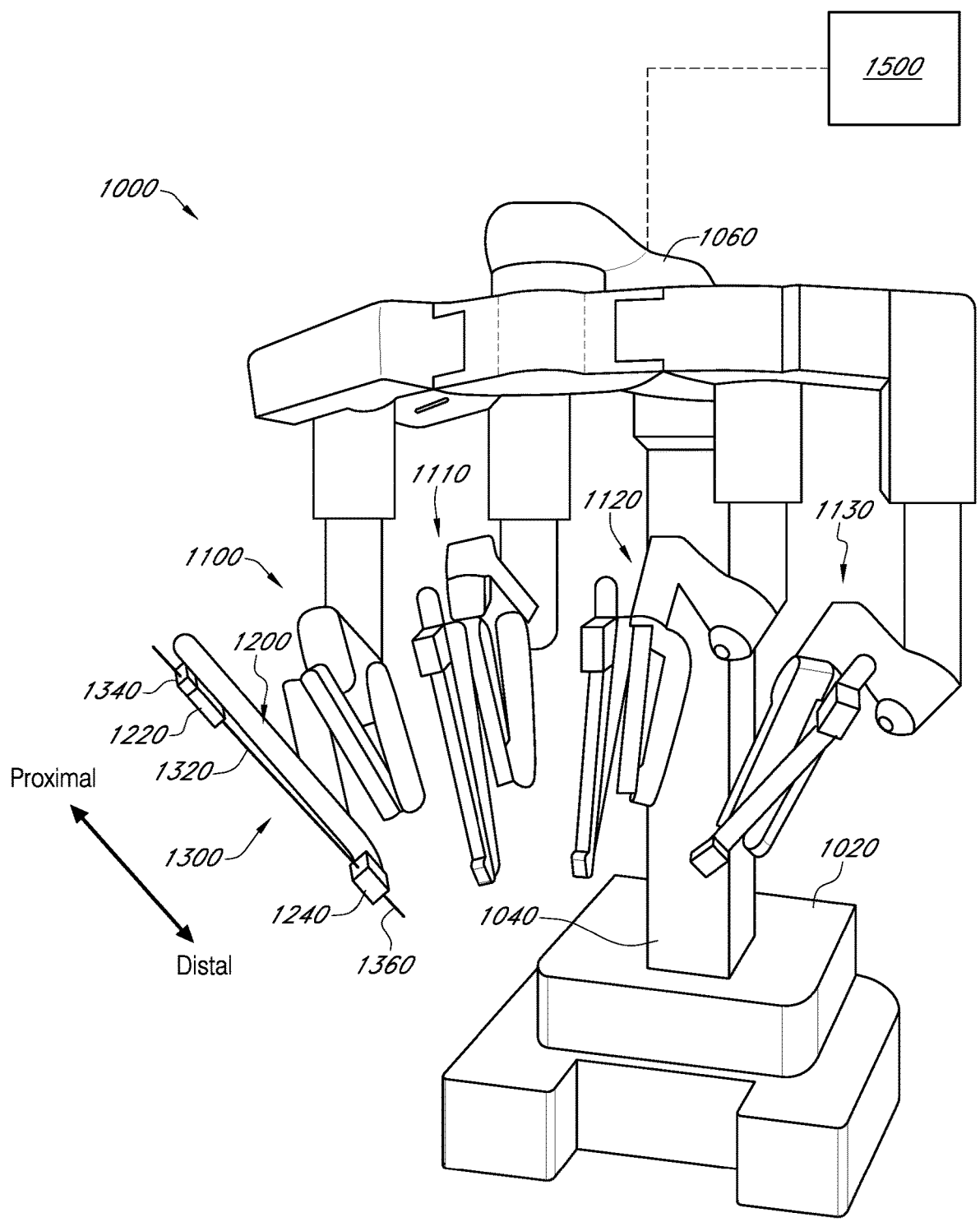
FIG. 12 is a perspective view of a manipulating system according to an embodiment of the present disclosure.

As discussed above, in accordance with various embodiments incorporating one or more aspects, devices of the present disclosure are configured for use in teleoperated, computer-assisted surgical systems (sometimes referred to as robotic surgical systems). Referring now to FIG. 12, an embodiment of a manipulating system 1000 of a teleoperated, computer-assisted surgical system, to which surgical instruments are configured to be mounted for use, is shown. Such a surgical system may further include a surgeon console (not shown) for receiving input from a user to control instruments of manipulating system 1000, as well as an auxiliary system, such as a control/vision cart (not shown), as described in, for example, U.S. Pat. Nos. 9,358,074 and 9,295,524, incorporated above. As those having ordinary skill in the art would appreciate, either or both of the surgeon console and the auxiliary system can include a display for displaying the images obtained from the imaging instrument.

As shown in the embodiment of FIG. 12, manipulating system 1000 includes a base 1020, a main column 1040, and a main boom 1060 connected to main column 1040. Manipulating system 1000 also includes a plurality of arms 1100, 1110, 1120, 1130, which are each connected to main boom 1060. Arms 1100, 1110, 1120, 1130 each include an instrument mount portion 1200 to which an instrument 1300 may be mounted, which is illustrated as being attached to arm 1100. Portions of arms 1100, 1110, 1120, 1130 may be manipulated during a surgical procedure according to commands provided by a user at the surgeon console. In an embodiment, signal(s) or input(s) transmitted from a user control system are transmitted to the auxiliary system, which may interpret the input(s) and generate command(s) or output(s) to be transmitted to the manipulating system 1000 to cause manipulation of an instrument 1300 (only one such instrument being mounted in FIG. 12) and/or portions of arm 1100 to which the instrument 1300 is coupled at the manipulating system 1000.

Instrument mount portion 1200 comprises a drive assembly 1220 and a cannula mount 1240, with an instrument carriage 1340 of the instrument 1300 connecting with the drive assembly 1220, according to an embodiment. Cannula mount 1240 is configured to hold a cannula 1360 through which a shaft 1320 of instrument 1300 may extend to a surgery site during a surgical procedure. Drive assembly 1220 contains a variety of drive and other mechanisms that are controlled to respond to input commands at the surgeon console and transmit forces to the instrument carriage 1340 to actuate the instrument 1300, as those skilled in the art are familiar with.

Although the embodiment of FIG. 12 shows an instrument 1300 attached to only arm 1100 for ease of viewing, an instrument may be attached to any and each of arms 1100, 1110, 1120, 1130. An instrument 1300 may be a surgical instrument with an end effector as discussed herein. A surgical instrument with an end effector may be attached to and used with any of arms 1100, 1110, 1120, 1130. The embodiments described herein are not limited to the embodiment of FIG. 12, and various other teleoperated, computer-assisted surgical system configurations may be used with the embodiments described herein.

Other configurations of surgical systems, such as surgical systems configured for single-port surgery, are also contemplated. For example, with reference now to FIG. 13, a portion of an embodiment of a manipulator arm 2140 of a manipulating system with two surgical instruments 2300, 2310 in an installed position is shown. The schematic illustration of FIG. 13 depicts only two surgical instruments for simplicity, but more than two surgical instruments may be received in an installed position at a manipulating system as those having ordinary skill in the art are familiar with.

Each surgical instrument 2300, 2310 includes an instrument shaft 2320, 2330 that at a distal end has a moveable end effector or, if the instrument is an imaging instrument, an endoscope, camera, or other sensing device, and may or may not include a wrist mechanism (not shown) to control the movement of the distal end.

In the embodiment of FIG. 13, the distal end portions of the instruments 2300, 2310 are received through a single port structure 2380 to be introduced into the patient. Other configurations of manipulating systems that can be used in conjunction with the present disclosure can use several individual manipulator arms. In addition, individual manipulator arms may include a single instrument or a plurality of instruments. Further, an instrument may be a surgical instrument with an end effector or may be a sensing instrument utilized during a surgical procedure to provide information, (e.g., visualization, electrophysiological activity, pressure, fluid flow, and/or other sensed data) of a remote site. Thus, one or more of the instruments may be an imaging instrument in accordance with various embodiments of the present disclosure.

The systems of FIGS. 12 and 13 also may include an operably coupled display device, generally labeled as 1500, 2500. The display device 1500, 2500 can include one or more displays that are part of the user control interface (now shown), and/or the auxiliary cart (not shown), and/or as a stand-alone component. The display device 1500, 2500 may be operably coupled to receive image data from an imaging instrument operably coupled to one of the manipulator arms 1100, 1110, 1120, 1130, 2420, 2430 to display images of the remote site, for example, real-time images, as those having ordinary skill in the art are familiar. The display device 1500, 2500 also may be operably coupled to the control system of the teleoperated system and be configured to display various graphical user interface images that can be controlled based on system use parameters and to provide additional information regarding system status to a user.

This description and the accompanying drawings that illustrate various embodiments should not be taken as limiting. Various mechanical, compositional, structural, electrical, and operational changes may be made without departing from the scope of this description and the invention as claimed, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A device for cleaning an instrument, the device comprising:
a manifold comprising one or more fluid inlets and a manifold fluid passage fluidically coupled to the one or more fluid inlets;
a tubular member rotatable relative to and extending distally from the manifold, the tubular member comprising:
a proximal end portion rotatably coupled to the manifold,
a distal end,
a fluid outlet at the distal end, the fluid outlet configured to direct a flow of fluid generally across the distal end of the tubular member, and
a plurality of tubular member fluid passages fluidically coupled to the fluid outlet, the plurality of tubular member fluid passages extending from the fluid outlet to the manifold,
wherein the manifold fluid passage is fluidically coupled with differing ones of the plurality of tubular member fluid passages in differing rotational orientations of the tubular member relative to the manifold, and
wherein the manifold and tubular member are configured to receive a shaft of an imaging instrument in a position such that the shaft of the imaging instrument extends through the manifold to the distal end of the tubular member.

2. The device of claim 1, wherein the plurality of tubular member fluid passages are formed at least partly within a wall of the tubular member.

3. The device of claim 1, wherein the tubular member comprises an inner sleeve and an outer sleeve, the plurality of tubular member fluid passages being between the inner sleeve and outer sleeve.

4. The device of claim 3, wherein the tubular member comprises a spacer member between the inner sleeve and the outer sleeve.

5. The device of claim 4, wherein the plurality of tubular member fluid passages are defined by a longitudinal opening through the spacer member.

6. The device of claim 3, wherein the inner sleeve and the outer sleeve comprise electrically conductive materials.

7. The device of claim 3, further comprising an electrically conductive component in conductive contact with the inner sleeve and the outer sleeve.

8. The device of claim 1, further comprising a nozzle portion extending distally from the tubular member, the nozzle portion comprising the fluid outlet.

9. The device of claim 1, wherein the one or more fluid inlets comprise a first fluid inlet configured to be fluidically coupled to a supply of a cleaning fluid and a second fluid inlet configured to be fluidically coupled to a supply of a pressurized gas.

10. The device of claim 1, wherein the plurality of tubular member fluid passages extend through a wall of the tubular member.

11. The device of claim 1, wherein:
each of the plurality of tubular member fluid passages has a first circumferential width; and
the manifold fluid passage has a second circumferential width different from the first circumferential width.

12. The device of claim 11, wherein the second circumferential width is greater than the first circumferential width.

13. A system, comprising:
an imaging instrument and the device of claim 1;
the imaging instrument comprising:
a shaft having a proximal end and a distal end, and
a viewing portion at the distal end of the shaft.

14. The system of claim 13, wherein the device further comprises a nozzle extending distally from the distal end of the tubular member and comprising the fluid outlet, the nozzle being configured to direct fluid across the viewing portion of the imaging instrument in a position of the shaft of the imaging instrument received in the tubular member.

15. A device for cleaning an instrument, the device comprising:
- a manifold comprising one or more fluid inlets and a manifold fluid passage fluidically coupled to the one or more fluid inlets, the manifold fluid passage comprising an annular relief extending around a portion of an interior surface of the manifold;
- a tubular member rotatable relative to and extending distally from the manifold, the tubular member comprising:
  - a proximal end portion rotatably coupled to the manifold,
  - a distal end,
  - a fluid outlet at the distal end, the fluid outlet configured to direct a flow of fluid generally across the distal end of the tubular member, and
  - one or more tubular member fluid passages fluidically coupled to the fluid outlet and extending from the fluid outlet to the manifold;
- wherein the manifold and tubular member are configured to receive a shaft of an imaging instrument in a position such that the shaft of the imaging instrument extends through the manifold to the distal end of the tubular member, and
- wherein the annular relief surrounds a perimeter of a portion of the tubular member, and
- wherein the one or more tubular member fluid passages is fluidically coupled with the annular relief in the interior surface of the manifold throughout a rotational range of motion of the tubular member relative to the manifold.

16. The device of claim 15, wherein a sloped profile feature is located between the annular relief and the one or more tubular member fluid passages, the sloped profile feature configured to guide fluid flow from the annular relief to the one or more tubular member fluid passages.

* * * * *